(12) United States Patent
Bagchi et al.

(10) Patent No.: US 11,436,207 B2
(45) Date of Patent: Sep. 6, 2022

(54) CLUSTERED DATABASE RECONFIGURATION SYSTEM FOR TIME-VARYING WORKLOADS

(71) Applicant: Purdue Research Foundation, West Lafayette, IN (US)

(72) Inventors: Saurabh Bagchi, West Lafayette, IN (US); Somali Chaterji, West Lafayette, IN (US); Paul Curtis Wood, Lafayette, IN (US); Ashraf Mahgoub, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 300 days.

(21) Appl. No.: 16/850,755

(22) Filed: Apr. 16, 2020

(65) Prior Publication Data

US 2021/0004357 A1  Jan. 7, 2021

Related U.S. Application Data

(60) Provisional application No. 62/871,083, filed on Jul. 5, 2019.

(51) Int. Cl.
*G06E 1/00* (2006.01)
*G06F 16/21* (2019.01)
(Continued)

(52) U.S. Cl.
CPC .......... *G06F 16/217* (2019.01); *G06F 9/5083* (2013.01); *G06F 11/3034* (2013.01);
(Continued)

(58) Field of Classification Search
CPC ..................................................... G06F 16/217
(Continued)

(56) References Cited

U.S. PATENT DOCUMENTS 9,176,762 B2 * 11/2015 Deshpande ......... G06F 9/45533
2019/0324808 A1 * 10/2019 Krishnan ............ G06F 9/45558

OTHER PUBLICATIONS

Agarwal, S.,et al., "Re-optimizing dataparallel computing", In Proceedings of the 9th USENIX conference on Networked Systems Design and Implementation, 2012, USENIX Association, pp. 21-21.

(Continued)

*Primary Examiner* — Evral E Bodden
(74) *Attorney, Agent, or Firm* — Purdue Research Foundation

(57) ABSTRACT

A system may forecast a plurality of workload measurements for a database management system (DBMS) at respective times based on a workload model. The system may determine, based on the forecasted workload measurements, configuration parameter sets optimized for the DBMS at the respective times. The system may generate a reconfiguration plan. The system may determine a performance gain that would result from reconfiguring nodes of the DBMS with the configurations parameter sets. In addition, the system may determine a performance loss that would result from the respective databases of the nodes being inaccessible during reconfiguration with the configuration parameter sets. The system may select a reconfiguration plan in response to the performance gain and the performance loss satisfying a fitness criterion. The system may cause, at the reconfiguration times, the nodes to begin reconfiguration with the configuration parameter sets included in the selected reconfiguration plan.

14 Claims, 8 Drawing Sheets

(51) Int. Cl.
- G06F 16/25 (2019.01)
- G06F 16/28 (2019.01)
- G06F 16/182 (2019.01)
- G06F 11/30 (2006.01)
- G06F 11/34 (2006.01)
- G06N 20/00 (2019.01)
- G06F 9/50 (2006.01)
- G06N 3/02 (2006.01)

(52) U.S. Cl.
CPC ........ *G06F 11/3409* (2013.01); *G06F 16/182* (2019.01); *G06F 16/21* (2019.01); *G06F 16/25* (2019.01); *G06F 16/285* (2019.01); *G06N 3/02* (2013.01); *G06N 20/00* (2019.01); *G06F 2209/5019* (2013.01)

(58) Field of Classification Search
USPC .......................................................... 706/21
See application file for complete search history.

(56) References Cited

OTHER PUBLICATIONS

Agrawal, S., et al., Integrating vertical and horizontal partitioning into automated physical database design. In ACM SIGMOD international conference on Management of data design, 2004, pp. 359-370.

Ajmani, S., et al, Modular software upgrades for distributed systems. ECOOP, Object-Oriented Programming, 2006, pp. 452-476.

Ananthanarayanan, G., et al, Scarlett: coping with skewedcontent popularity in mapreduce clusters. In Proceedings of the sixth conference on Computer systems, 2011, ACM, pp. 287-300.

Ardekani, M., et al., "A selfconfigurable geo-replicated cloud storage system", In OSDI, 2014, pp. 367-381.

Barker, S., et al., "Shuttledb: Database-aware elasticity in the cloud", In ICAC, 2014, pp. 33-43.

Cassandra. Cassandra. http://cassandra.apache.org/, Sep. 2018.

Chaterji, S., et al., "Federation in genomics pipelines: techniques and challenges" Briefings in bioinformatics, 2017, pp. 235-244.

Chaudhuri, S., et al., "Self-tuning database systems: a decade of progress", In Proceedings of the 33rd international conference on Very large data bases, 2007, VLDB Endowment, pp. 3-14.

Chaudhuri, S., et al., "An efficient, cost-driven index selection tool for microsoft sql server", In VLDB, 1997, pp. 146-155.

Cooper, B., et al., "Benchmarking cloud serving systems with ycsb", In Proceedings of the 1st ACM symposium on Cloud computing, 2010, ACM, pp. 143-154.

Curino, C., et al., "Schism: a workload-driven approach to database replication and partitioning", VLDB Endowment, 2010, pp. 48-57.

Das, S., et al., "Albatross: lightweight elasticity in shared storage databases for the cloud using live data migration", VLDB Endowment, 2011, pp. 494-505.

DCSL. Rafiki configuration tuner middleawre. https://engineering.purdue.edu/dcsl/software/, Feb. 2018.

Debnath, B., et al., "Sard: A statistical approach for ranking database tuning parameters", In IEEE International Conference on Data Engineering Workshop (ICDEW), 2008, pp. 8.

Duan, S., et al., "Tuning database configuration parameters with ituned" Proceedings of the VLDB Endowment 2, 1, 2009, pp. 1246-1257.

Elmore, A. , et al., "Zephyr: live migration in shared nothing databases for elastic cloud platforms.", In ACM SIGMOD International Conference on Management of data, 2011, pp. 12.

Faloutsos, C., et al., "Forecasting big time series: old and new", Proceedings of the VLDB Endowment, 11, 12 , 2018, pp. 2102-2105.

Featherston, D., et al., "Cassandra: Principles and application", Department of Computer Science University of Illinois at Urbana-Champaign, 2010, pp. 27.

Ferguson, A., et al., "Jockey: guaranteed job latency in data parallel clusters", In Proceedings of the 7th ACM European Conference on Computer Systems (Eurosys), ACM, 2012, pp. 99-112.

Ghosh, M., et al., "Morphus: Supporting online reconfigurations in sharded nosql systems", IEEE Transactions on Emerging Topics in Computing, 2015, pp. 466-479.

Gifford, D., et al., "Weighted voting for replicated data", In SOSP, 1979, pp. 150-162.

Greenberg, H., et al., "MDHIM : A parallel key/value framework for HPC", In 7th USENIX Workshop on Hot Topics in Storage and File Systems (HotStorage 15), 2015, pp. 5.

GROUPS.GOOGLE. Problem with restart redis with vm feature on. https://groups.google.com/forum/#!topic/redis-db/EQA0Wdvwghl, Mar. 2011.

Gupta, H., et al., "Index selection for olap". In IEEE International Conference on Data Engineering (ICDE), 1997, pp. 12.

Henderson, R., "Job scheduling under the portable batch system", In Workshop on Job Scheduling Strategies for Parallel Processing, Springer, 1995, pp. 279-294.

Jia, Z., et al., "Characterizing data analysis workloads in data centers", In 2013 IEEE International Symposium on Workload Characterization (IISWC), IEEE, 2013, pp. 66-76.

Kemme, B., et al., "Online reconfiguration in replicated databases based on group communication", In Dependable Systems and Network (DSN), IEEE, 2001, pp. 117-126.

Khandelwal, A., et al., "Blowfish: Dynamic storage-performance tradeoff in data stores", In NSDI, 2016, pp. 485-500.

Kim, S., et al., "EP-DNN: a deep neural network-based global enhancer prediction algorithm", Scientific reports 6 , 2016, 38433, pp. 13.

Kim, S., et al., "Opening up the blackbox: an interpretable deep neural network-based classifier for cell-type specific enhancer predictions", BMC systems biology 2016, 10, 2, 54, pp. 243-258.

Koo, J., et al, Tiresias: Context-sensitive approach to decipher the presence and strength of MicroRNA regulatory interactions Theranostics, 2018, 8, 1, pp. 277-291.

Kulkarni, C., et al., Rocksteady: Fast migration for low-latency in-memory storage. In Proceedings of the 26th Symposium on Operating Systems Principles, ACM, 2017, pp. 390-405.

Labs, R. Redis Virtual Memory, https: //redis.io/topics/virtual-memory, 2018. [Online; accessed Sep. 1, 2018].

Labs, R. Redis Cluster. https://redis.io/topics/cluster-tutorial, 2019. [Online; accessed May 1, 2019].

Labs, R. Spark-Redis: Analytics Made Lightning Fast. https://redislabs.com/solutions/use-cases/spark-and-redis/, 2019. [Online; accessed May 1, 2019].

Lakshman, A., et al., "Cassandra: a decentralize structured storage system", ACM SIGOPS Operating Systems Review, 2010, 44, 2, pp. 35-40.

Leipzig, J., "A review of bioinformatic pipeline frameworks", Briefings in bioinformatics, 2017, 18, 3, pp. 530-536.

Li, M., Zeng, et al., "Mronline: Mapreduce online performance tuning", In Proceedings of the 23rd international symposium on High-performance parallel and distributed computing, ACM, 2014, pp. 165-176.

Ma, L., et al., "Query-based workload forecasting for self-driving database management systems", In Proceedings of the 2018 International Conference on Management of Data (SIGMOD), ACM, pp. 631-645.

Mahadik, K., et al., "SARVAVID: A domain specific language for developing scalable computational genomics applications", In International Conference on Supercomputing, ACM, pp. 12.

Mahgoub, A., et al., "Rafiki: A Middleware for Parameter Tuning of NoSQL Datastores for Dynamic Metagenomics Workloads", In Proceedings of the 18th International ACM/IFIP/USENIX Middleware Conference, 2017, pp. 1-13.

Maji, A., et al., "Ice: An integrated configuration engine for interference mitigation in cloud services", In EEE International Conference on Autonomic Computing (ICAC), 2015.

Maji, A., et al., "Mitigating interference in cloud services by middleware reconfiguration", In ACM International Middleware Conference, 2014.

(56) References Cited

OTHER PUBLICATIONS

Meyer, F., et al., "MG-RAST version 4—lessons learned from a decade of low-budget ultra-high-throughput metagenome analysis", Briefings in bioinformatics, 2017, pp. 1151-1159.
Mozafari, B., et al., "Performance and resource modeling in highly-concurrent oltp workloads", In Proceedings of the 2013 acm sigmod international conference on management of data, ACM, 2013, pp. 301-312.
Olson, M., et al., "Berkeley DB". In USENIX Annual Technical Conference, 1999, pp. 183-191.
Pavlo, A., et al., "On predictive modeling for optimizing transaction execution in parallel oltp systems", VLDB Endowment, 2011, pp. 85-96.
Rao, J., et al., "Automating physical database design in a parallel database", In ACM SIGMOD international conference on Management of data, 2002, pp. 558-569.
SCYLLADB. Scylla vs. Cassandra benchmark, http://www.scylladb.com/technology/cassandra-vs-scylla-benchmark-2/, Oct. 2015.
SCYLLADB. ScyllaDB. http://www.scylladb.com/, Sep. 2017.
Sears, R., et al., blsSM a general purpose log structured merge tree. In Proceedings of the 2012 ACM SIGMOD International Conference on Management of Data, ACM, 2012, pp. 217-228.
SERVERFAULT. Should 1 use vm or set the maxmemory.https://serverfault.com/questions/432810/should-i-use-vm-or-set-themaxmemory-with-redis-2-4, Sep. 2012.
Sullivan, D., et al., "Using probabilistic reasoning to automate software tuning", vol. 32. 2004, ACM, pp. 404-405.
Tran, D. et al., "A new approach to dynamic self-tuning of database buffers", ACM Transactions on Storage (TOS), 2008, pp. 25.
Valentin, G., et al., "Db2 advisor: An optimizer smart enough to recommend its own indexes", In IEEE International Conference on Data Engineering (ICDE), 2000, pp. 10.
Van Aken, D., et al., "Automatic database management system tuning through large-scale machine learning", In Proceedings of the 2017 ACM International Conference on Management of Data, ACM, 2017, pp. 1009-1024.
Wang, S., et al., "Understanding and auto-adjusting performance-sensitive configurations", In International Conference on Architectural Support for Programming Languages and Operating Systems (ASPLOS), 2018, pp. 15.
Wei, X., et al., "Replication-driven live reconfiguration for fast distributed transaction processing", In USENIX Annual Technical Conference, 2017, pp. 335-347.
Zaharia, M., et al., "Spark: Cluster computing with working sets", In Proceedings of the 2Nd USENIX Conference on Hot Topics in Cloud Computing (Berkeley, CA, USA, 2010), HotCloud'10, USENIX Association, pp. 7.
Zhang, R., et al., "Finding the big data sweet spot: Towards automatically recommending configurations for hadoop clusters on docker containers", In Cloud Engineering (IC2E), 2015 IEEE International Conference on (2015), IEEE, pp. 365-368.
Zhu, Y., et al., "Bestconfig: Tapping the performance potential of systems via automatic configuration tuning", In Symposium on Cloud Computing (SoCC), 2017, pp. 338-350.

* cited by examiner

US 11,436,207 B2

CLUSTERED DATABASE RECONFIGURATION SYSTEM FOR TIME-VARYING WORKLOADS

CROSS-REFERENCE TO RELATED APPLICATIONS

This application claims the benefit of U.S. Provisional Application No. 62/871,083 filed Jul. 5, 2019, the entirety of which is hereby incorporated by reference.

GOVERNMENT FUNDING

This invention was made with government support under 1R01AI123037-01 awarded by National Institutes of Health. The government has certain rights in the invention.

TECHNICAL FIELD

This disclosure relates to database management and, in particular, to database management with dynamic, time-varying workloads.

BACKGROUND

Proper configuration for a database management system is crucial for maximizing database throughput. While traditional performance enhancements techniques may automatically identify close-to-optimal configurations for static workloads, these approaches suffer from a variety of drawbacks, disadvantages, and inefficiencies for dynamic workloads.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
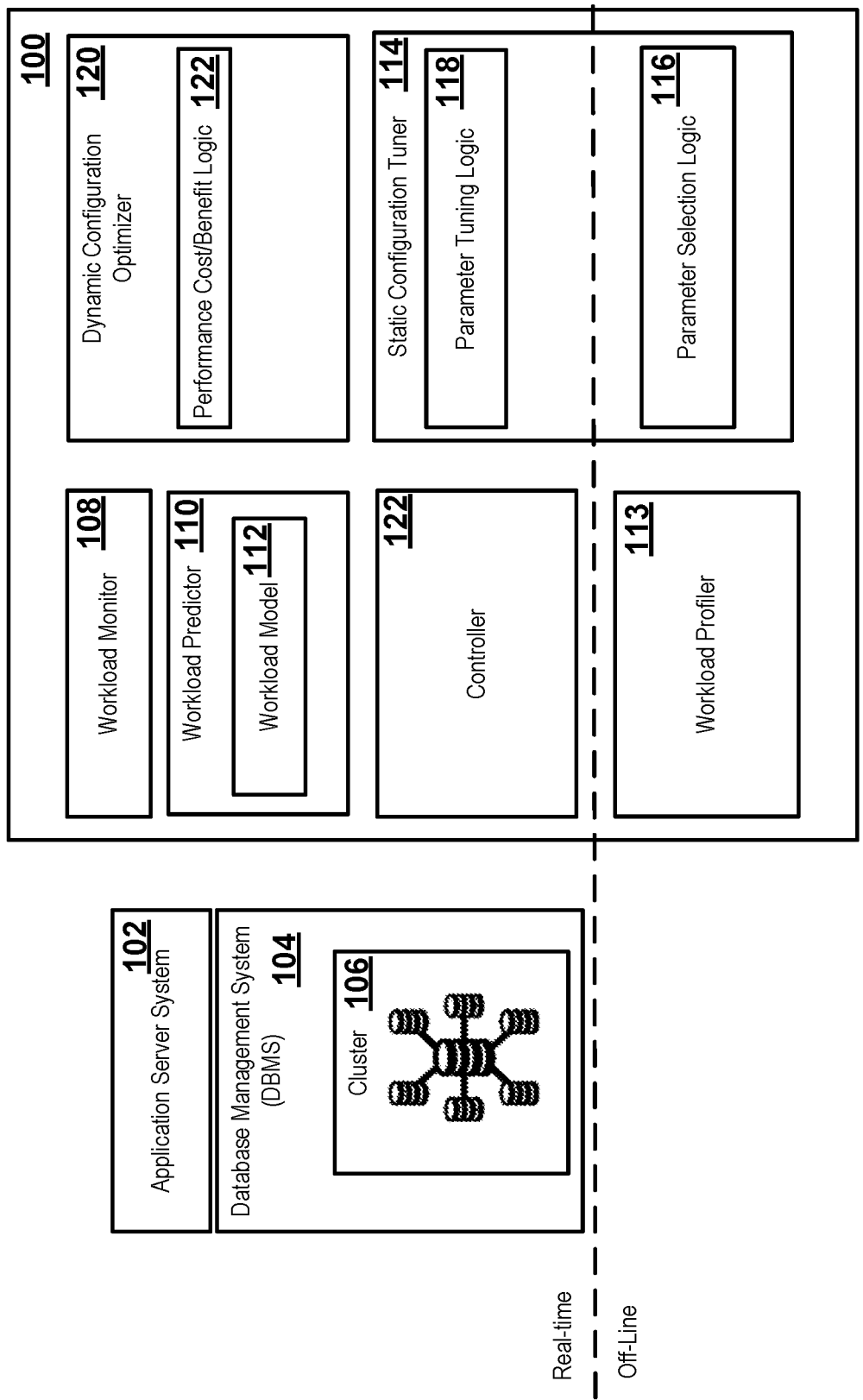
FIG. 1 illustrates a first example of a system.

Optimizing configuration settings for database systems (DBMS) presents a variety of technical challenges due to the plethora of performance-related parameters and the complex interdependencies among subsets of these parameters. For example, Cassandra has 56 performance tuning parameters and Redis has 46 such parameters. Traditional approaches to database tuning have solved the problem of optimizing a DBMS when workload characteristics relevant to the data operations are relatively static. These so called "static configuration tuners" fail to decide on a set of configurations over a window of time in which the workloads are changing, i.e., what configuration to change to and when to instantiate this change. Further, existing solutions fail to perform the reconfiguration of a cluster of database instances without degrading data availability.

While workload changes may lead to new optimal configurations, it is not always desirable to switch to new configurations because the new workload pattern may be transient or reconfiguration action may cost (in terms of performance cost and not dollar cost) more than the performance gain achieved by switching to the new configuration. A reconfiguration action may incur a performance cost over a reconfiguration period as nodes become inaccessible to apply the configuration changes.

Traditional approaches to reconfiguration often apply a naïve reconfiguration whenever the workload changes. A naïve reconfiguration, which is oblivious to the reconfiguration cost, may degrade the performance for dynamic workloads relative to the default configurations and also relative to the best static configuration. In experiments involving a metagenomics workload in the metagenomics portal called multi-tenant, global-scale metagenomics repository (MG-RAST), it was found that during periods of high dynamism in the read-write switches], naïve reconfiguration degrades throughput by a substantial 61.8% over default.

These and other technical challenges are overcome by the system and methods described herein. By way of introductory example, a system may forecast a plurality of workload measurements for a database management system (DBMS) at a plurality of respective times based on a workload model. The workload measurements may represent a load on a DBMS at the respective times. The system may determine, based on the forecasted workload measurements, a plurality of configuration parameter sets optimized for the DBMS at the respective times. The system may generate a reconfiguration plan. The reconfiguration plan may include at least two of the configuration parameters sets and corresponding reconfiguration times to apply the configuration parameter sets, respectively. The system may determine a performance gain measurement that would result from reconfiguring nodes of the DBMS with the configurations parameter sets according to the reconfiguration times. In addition, the system may determine a performance loss measurement that would result from the respective databases of the nodes being inaccessible during reconfiguration with the configuration parameter sets. The system may select a reconfiguration plan in response to the performance gain measurement and the performance loss measurement satisfying a fitness criteria. The system may cause, at the reconfiguration times, respectively, the nodes to begin reconfiguration with the configuration parameter sets included in the selected reconfiguration plan.

An example of technical advantages of the system and methods described herein is an optimization technique that combines workload prediction with a performance cost-benefit analysis. The system may compute the relative cost and benefit of each reconfiguration step and determine an optimal reconfiguration for a future time window. This plan specifies when and how to change configurations to achieve the best performance without degrading data availability. Additional benefits, efficiencies, and improvements are made evident in the systems and methods described herein.

FIG. 1 illustrates a first example of a system 100. The system 100 may include, or communicate with, an application server 102 and one or more database management system (DBMS) 104. The application server 102 system may include, for example, one or more servers that execute applications, such as web applications, that apply a workload to the DBMS 104. In various experiments, as described herein, examples of the application server system included a multi-tenant, global-scale metagenomics repository (MG-RAST), a bus-tracking application (Tiramisu), and/or an HPC data-analytics system. These examples are provided for illustrative purposes and are not intended to limit the type of application server described herein. In general, the application server 102 may generate varying levels of workload complexity and dynamic workload changes.

The system may include, or communicate with, the database management system (DBMS) 104. The DBMS 104 may include a combination of software and hardware designed to define, manipulate, retrieve and manage data in a database (or plurality of databases). The DBMS 104 may have rules to validate, manipulate, and or replicate the data. While the system and methods described herein provide high efficiency to not-only-SQL (NoSQL), it should be appreciated that the system may provide efficiencies to all forms of relational and non-relational databases.

In general, the DBMS 104 may include a cluster 106 or multiple clusters. The cluster may include a plurality of server nodes. The nodes may include one or more databases. Depending on the particular protocol of the DBMS 104, the DBMS 104 may replicate the nodes and/or the databases stored by the nodes. Thus, in some examples, each node may have separate sets physical or virtual hardware, the DBMS 104 may maintain consistency between the databases of each node. Many types and implementations of the DBMS 104 are possible.

The system may include a workload monitor 108. The workload monitor 108 may receive workload traces from the DBMS 104 and/or the application server system 102. In some examples, the workload monitor 108 may monitor an aggregated workload at a gateway to the database cluster or nodes therein. Alternatively or in addition, the workload monitor 108 may query each database instance for is past or near past workload. In some examples, the workload monitor 108 may communicate with the application server system 102 in addition to the DBMS 104 to obtain workload information.

As described herein, a workload at a particular point in time may be described as a vector of various time-varying features. Thus, a workload may be described as:

$$W(t)=\{p_1(t), p_2(t), p_3(t), \ldots, p_n(t)\} \quad (1)$$

where the workload at time t is W(t) and $p_i(t)$ is the time-varying i-th feature. These features may be directly measured from the database(s) of the node(s), such as the load (i.e., requests/s) and the occupancy level of the database, or they may come from the computing environment, such as the number of users or jobs in a batch queue. These features are application dependent and are identified by analyzing historical traces. Examples for time-varying features of each application are described in the example datasets below. As described herein, a workload feature is interchangeably referred to as a workload measurement. In addition, a workload trace, as defined herein, is defined as plurality of workload measurements at one or more time instant.

The system may include a workload predictor 110. The workload predictor 110 may forecast future workloads based on a workload model 112. The workload model 112 may include a machine learning model initially trained from representative workload traces from prior runs of the application. Examples of the workload model may include Markov chain model, a neural network, or the like. The system may include a workload profiler. Th workload profiler 113 may receive workload trace information from the workload monitor 108, logs from the DBMS 102 and/or application server system 104. Alternatively or in addition, the workload profiler 113 may receive training data, such as labeling or other human inputs, to train and/or retrain the workload model 112. The workload model refinement may occur offline, while a previously trained workload is applied by the workload predictor for real-time forecasting.

In some examples, the workload predictor 110 may determine if any future workload changes exist that merit a reconfiguration. For example, the workload predictor 110 may access a workload change criteria that compares a forecasted workload to a present or previously predicted workloads. The workload predictor 110 may raise an event-driven trigger when the workload predictor 110 identifies a workload change that satisfies the workload change criteria (i.e. workload measurements of a workload trace exceeding predefined threshold(s)).

The workload predictor 110 may be periodically updated with a new or updated workload model 112 as the workload model 112 is retrained with new information. For example, the workload profiler may receive As described herein, a forecasted workload may include one or more workload measurements estimated to occur at a future time. In addition, the forecasted workload may include (or be associated with) a future time when the workload is expected to occur. In some examples, the forecasted workload may also include probability information indicative of the accuracy of the prediction.

The DBMS 104, and/or nodes or clusters 106 of the DBMS 104, may receive configuration parameters. A configuration parameter, as defined herein, is configurable setting that affects the manner in which the DBMS 104 operates. A configuration parameter may be stored by nodes of the DBMS 104 and subsequently changed. In some examples, the node, the database stored on the node, or other components of the node, may be inaccessible during reconfiguration. For example, the node, or services, operating systems, etc, may require restart to apply updates to configuration settings. It should be appreciated that configuration settings stored on the nodes may be tuned for particular workloads or ranges of workloads. Thus, a configuration parameter set (a group of configuration parameters) may be optimal for some workloads, but not others.

The system 100 may include a static configuration tuner 114. The static configuration tuner 114 may determine an optimal configuration for a forecasted workload. The static configuration tuner 114 may be initially trained on the same traces from the system as the workload predictor 110. Similarly, the static configuration tuner 114 may also trained incrementally like the workload predictor 110. For example, the static configuration tuner 114 may be initially trained from representative historical workload traces and incrementally updated with additional data.

In some examples, the static configuration tuner 114 may include a parameter selection logic 116 and a parameter tuning logic 118. The parameter selection logic and the parameter tuning logic are described in more detail in the discussion related to FIG. 2 below.

The system 100 may further include a dynamic configuration optimizer 120. The dynamic configuration optimizer 120 may generate a time-varying reconfiguration plan for over a look-ahead time window. The reconfiguration plan may include (or identify) both the time points when reconfiguration should be initiated and a new set of configuration parameters for each such time point.

The dynamic configuration optimize 120 may include a performance cost-benefit analysis logic (CBA). The CBA logic 122 may analyze both static, point solution information and the estimated, time-varying workload information. The CBA logic may execute every look-ahead time window apart and/or when the workload characteristics have changed significantly. For example, the CBM may detect an event-driven trigger from the workload predictor 110 in response to a predicted workload change.

The system 100 may further include a controller 124. The controller 124 may invoke a distributed protocol to gracefully switch one or more nodes to new configurations according to the reconfiguration plan. The controller 124 may be centralized or replicated and distributed with distribution management tools such as like ZooKeeper or the like. The controller 124 may determine how many instances to switch concurrently such that the cluster always satisfies availability and consistency requirements of the DBMS 104.

Figure 2:
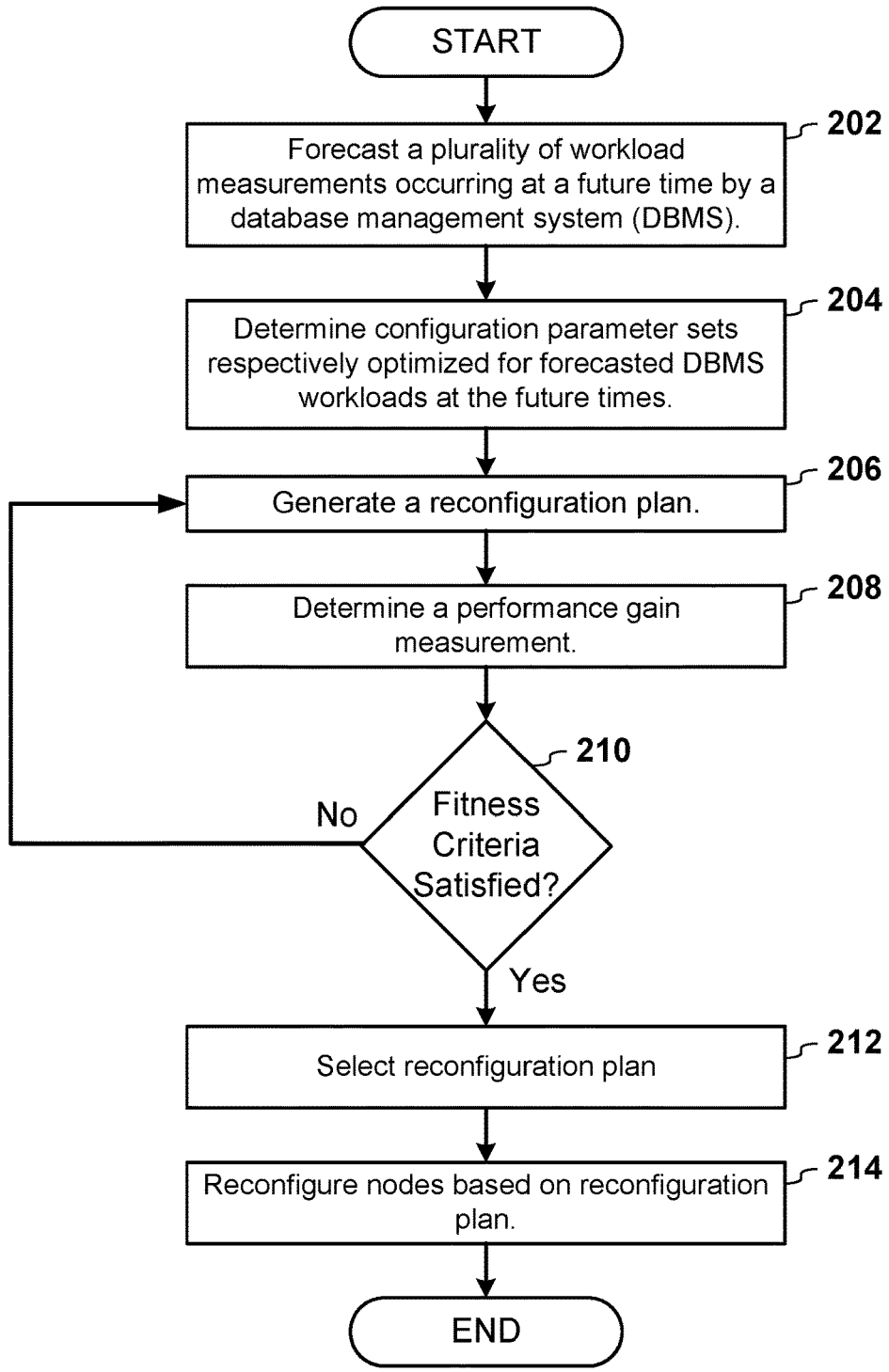
FIG. 2 illustrates example logic for the system.

FIG. 2 illustrates example logic for the system 100. Reference to FIG. 1 is made throughout the following discussion of FIG. 2. The workload predictor 110 may forecast a plurality of workload measurements occurring at a future time by the DBMS 104 (202). The forecasted workloads measurements may be determined based on the workload model 112. Each of the forecasted workload measurements may be associated with a respective time point. Thus, the forecasted workload measurements may be indicative of a load on a database management system at future respective times. For example, the workload measurements may correspond to workload features (Equation 1) predicted to be measured from workload traces in the future.

For workload forecasting, the workload predictor 110 may access historical workload measurements. The workload predictor 110 may apply these historical workload measurements to the workload model 112 to obtain the forecasted workloads.

In some examples, the system may discretize time into sliced $T_d$ durations to bound the memory and computation cost. The workload may be predicted as $$(W(t_{k+1}) = f_{pred}(W(t_k), W(t_{k-1}), \ldots, W(t_0))) \quad (2)$$

where k is the current time index into $T_d$-wide steps. For ease of exposition, the term $T_d$ is dropped in the description herein, assuming implicitly that this is one-time unit. The term $f_{pred}$ may represent logic, such as a machine learning logic provided by the workload predictor 110, that implements or accesses a workload model 112 that that can predict workload. For example, the workload model may include a Markov-Chain model. Alternatively, the workload predictor 110 may access more sophisticated models, such as a neural network.

The static configuration tuner 114 may determine configuration parameter sets respectively optimized for forecasted DBMS workloads at the future times (204).

In other words, the static configuration tuner 114 may determine the optimal configuration parameter set for at workload at a given future time. To reduce the parameter space to a feasible size, the parameter selection logic 116 of the static configuration tuner 114 may identity which of the configuration parameters have the highest impact on performance. For example, the parameter selection logic 116 may apply analysis-of-variance (ANOVA), or other statistical techniques, to estimate the importance of each parameter. The parameter selection logic 116 may select the top-k parameters in its configuration optimization method, which is in turn determined by a significant drop-off in the importance score.

In various experiments, high scoring configuration parameters often included: (1) Compaction method, (2) #Memtable flush writers, (3) Memory-table clean-up threshold, (4) Trickle fsync, (5) Row cache size, (6) Number of concurrent writers, and (7) Memory heap space. These parameters vary with respect to the reconfiguration cost that they entail. In experiments where Cassandra was used for the DBMS 104, the change to the compaction method may incur the highest cost as it causes every database instance to read all its SSTables and re-write them to the disk in the new format. However, due to interdependability between these parameters, the compaction frequency is still being controlled by reconfiguring the second and third parameters with the cost of a server restart. Similarly, parameters 4, 6, 7 need a server restart for their new values to take effect and these cause the next highest level of cost. Finally, some parameters (i.e. parameter 5) can be reconfigured without needing a server restart and therefore have the least level of cost.

The parameter tuning logic 118 may identify the optimal values for each of the configuration parameters for a given workload. The result is an optimized set of the most important configuration parameters for a given workload. For example, the parameter selection logic 116 may identify that the DBMS 104 has a set of performance impactful configuration parameters, $C=\{c1, c2, \ldots, cn\}$. The optimal configuration $C_{opt}$ may depend on the particular workload $W(t)$ executing at a point in time. In order to optimize performance, the static tuner may determine an estimate of throughput for both the optimal and/or current configuration for any workload:

$$H_{sys} = f_{ops}(W(t), C_{sys}) \quad (3)$$

where $H_{sys}$ is the throughput of the cluster of nodes with a configuration $C_{sys}$ and $f_{ops}(W(t), C_{sys})$ provides the system-level throughput estimate. $C_{sys}$ may yave $N_s \times |C|$ dimensions for $N_s$ servers and C different configurations. Some DBMS, such as Cassandra, may achieve efficient load balancing across multiple instances whereby each contributes approximately equally to the overall system throughput. Thus, a single server average performance may be defined as defined as $H_i = H_{sys}/N_s$ The parameter tuning logic 118 may include performance prediction logic $f_{ops}$, which represents logic to apply a performance model. The performance prediction model may access a trained model that captures relationships (such as weights and biases) between features representative of at least performance, workload, and the database comigration. The performance model may include, for example, a deep neural network or some other suitable machine learning model.

Thus, optimal configurations may be selected for a given workload:

$$C_{opt}(W(t)) = \underset{C_{sys}}{\operatorname{argmax}} H_{sys} = \underset{C_{sys}}{\operatorname{argmax}} f_{ops}(W(t), C_{sys}) \qquad (4)$$

In general, $C_{opt}$ may be unique for each server and/or the same across all servers. In examples where $C_{opt}$ is the same for each server, it will have a dimension of C making the problem computationally easier. Such implementation provide a design simplification because they perform the reconfiguration of the cluster as an atomic operation. Thus, to streamline the reconfiguration process, the controller 122 may prevent stopping a reconfiguration action mid-stream and all servers may be reconfigured in round i prior to beginning any reconfiguration of round i+1. The efficiency of the performance prediction logic $f_{ops}$ may be improved by constructing a cached version with the optimal configuration $C_{opt}$ for a subset of Wand using nearest-neighbor lookups whenever a near enough neighbor is available.

The dynamic configuration optimizer 120 may generate a reconfiguration plan (206). The reconfiguration plan may include at least two configuration parameters sets previously identified as optimal at various time points. The reconfiguration plan may designate the time points as reconfiguration times to apply the configuration parameter sets, respectively.

To generate the optimal reconfiguration plan the system may maximize the total throughput (or other performance related measurement) for a database system when faced with dynamic workloads. This introduces time-domain components into the optimal configuration strategy $C_{opt}^T$=Copt(W (t)), for all points in (discretized) time till a lookahead $T_L$. In general, finding solutions for $C_{opt}^T$ can become impractical since the possible parameter space for C is large and the search space increases linearly with $T_L$. To estimate the size of the configuration space, consider that in our experiments we assumed a lookahead $T_L$=30 minutes and used 7 different parameters, some of which are continuous, e.g., Memory-table clean-up threshold. If we take an underestimate of each parameter being binary, then the size of the search space becomes $2^{7 \times 30}$=1.6×10$^{63}$ points, an impossibly large number for exhaustive search.

Accordingly, the dynamic configuration optimizer 120 generates a compact representation of the reconfiguration points (Δ's) to easily represent the configuration changes. The minimum number of switches within $T_L$, say M, is bounded since each switch takes a finite amount of time. The search space for the dynamic configuration optimization is then Combination($T_L$, M)×|C|. This comes from the fact that dynamic configuration optimizer analysis at most M points to switch out of all the $T_L$ time points and at each point there are |C| possible configurations.

Based on the foregoing, the reconfiguration plan may be defined as:

$$C_{sys}^\Delta = [T = \{t_1, t_2, \ldots, t_M\}, C = \{C_1, C_2, \ldots, C_M\}] \qquad (5)$$

where $t_k$ is a point in time and $C_k$ is the configuration to use at $t_k$. Thus, the reconfiguration plan identifies when to perform a reconfiguration and at each such point, what configuration to choose.

Reconfiguration may incur a performance cost and changing parameters may require various actions to commit the reconfiguration changes that make a database inaccessible (e.g. restarting hardware or software) or otherwise degrading the database services (e.g., by flushing a cache). Accordingly, the dynamic configuration optimizer 120 may calculate the costs of implementing a reconfiguration plan by determining the number, duration, and/or magnitude of degradations. If a reconfiguration plan is found globally beneficial, the controller may initiate the plan, else it is rejected.

Accordingly, the dynamic configuration optimizer 120 may determine a performance gain measurement that would result from reconfiguring nodes of the DBMS 104 based on the generated reconfiguration plan (210). In addition, the system may determine a performance loss measurement that would result from downtime or segregation of the nodes during reconfiguration (210). The objective for the system select the best reconfiguration plan $(C_{sys}^\Delta)^{opt}$ for the period of optimization, lookahead time $T_L$:

$$(C_{sys}^\Delta)^{opt} = \underset{C_{sys}^\Delta}{\operatorname{argmax}} B(C_{sys}^\Delta, W) - L(C_{sys}^\Delta, W) \qquad (6)$$

where $C_{sys}^\Delta$ is the reconfiguration plan, B is the benefit function, and L is the cost (or loss) function, and W is the time-varying workload description.

Qualitatively, the benefit summed up over the time window is the increase in throughput due to the new optimal configuration option relative to the current configuration option.

$$B = \sum_{k \in [0,T_L]} H_{sys}(W(k), C_{sys}^T(k)) \qquad (7)$$

where W(k) is the k-th element in the time-varying workload vector W and $C_{sys}^T$ is the time-varying system configuration derived from $C_{sys}^\Delta$.

The loss function (L) captures the opportunity cost of having each of $N_s$ servers offline for $T_r$ seconds for the new workload versus if the servers remained online with the old configuration. Since downtime due to reconfiguration won't exceed a threshold for declaring a node is dead (3 hours by default for Casandra), data-placement tokens are not reassigned due to reconfiguration. Therefore, we do not include cost of data movement in functions L, though other examples of L may also include a cost of data movement. In some examples, the DBMS 104 can work with additional or alternative reconfiguration costs, including different costs for different parameters—these can be fed into the loss function L.

Accordingly, the cost summed up over the time window may be expressed as the loss in throughput incurred during the transient period of reconfiguration.

$$L = \sum_{k \in [1,M]} \frac{N_s}{N} \cdot H_{sys}(W(t_k), C_k) \cdot \frac{N_s}{N} \cdot T_r = \sum_{k \in [1,M]} H_{sys}(W(t_k), C_k) \cdot T_r \qquad (8)$$

where $C_k$ the configuration specified by the k-th entry of the reconfiguration plan $C_{sys}^\Delta$ and $T_r$ is the number of seconds a single server is offline during reconfiguration.

The dynamic configuration optimizer 120 may determine whether the performance gain measurement and the performance loss measurement satisfy a fitness criteria (210). In response to the fitness criteria being satisfied (210, yes), the dynamic configuration optimizer 120 may select a reconfiguration plan as optimal (212).

In some examples, the fitness criteria may include a threshold performance value that represents the minimum performance gain (benefit-loss form Eq. 6) that should be achieved by a reconfiguration plan. However, the fitness criteria may also be time-based or iteration based. For example, the fitness criteria may include a maximum number of reconfiguration plans that are generated and evaluated. Alternatively or in addition, the fitness criteria may include a total amount of time that that is permitted for generating and evaluating reconfiguration plans. For example, the best performing reconfiguration plan may be selected from a plurality of reconfiguration plans after an allocated search time and/or iteration count has elapsed.

Ultimately, the evaluation of the reconfiguration plan(s) identifies a reconfiguration plan where time-integrated gain (benefit-cost) of the from Eq. (6) is maximized or nearly maximized. The three unknowns in the optimal plan are M, T, and C, from Eq. (5). If only R nodes can be reconfigured at a time, at least $T_r=N_s/R$ time must elapse between two configurations. This puts a limit on M, the maximum number of reconfigurations that can occur in the lookahead period $T_L$.

A greedy solution for Eq. (6) that picks the first configuration change with a net-increase in benefit may produce suboptimal $C_{sys}^\Delta$ over the horizon $T_L$ because it does not consider the coupling between multiple successive workloads. For example, considering a pairwise sequence of workloads, the best configuration may not be optimal for either $W(t_1)$ or $W(t_2)$ but is optimal for the paired sequence of the two workloads. This could happen if the same configuration gives reasonable performance for $W(t_1)$ or $W(t_2)$ and has the ad-vantage that it does not have to switch during this sequence of workloads. This argument can be naturally extended to longer sequences of workloads.

A $T_L$ value that is too long will cause the system to include decision points with high prediction errors, and a value that is too short will cause the system to make almost greedy decisions. The appropriate lookahead period is selected by benchmarking the non-monotonic but convex throughput while varying the lookahead duration and selecting the point with maximum end-to-end throughput.

In some examples, the generating the reconfiguration plan (208), determining if the fitness criteria is satisfied (210), and/or selection of the reconfiguration plan (212) may occur by way of a heuristic search technique, such as a genetic algorithm (GA). Although meta-heuristics like GA do not guarantee finding global optima, a genetic algorithm presents desirable properties for system. For example, the search space is non-convex because many of the parameters impact the same resources such as CPU, RAM, and disk, and settings of one parameter impact the others. Greedy or gradient descent-based searches are prone to converge to a local optima. Also the GA's tunable completion is needed in our case for speedy decisions, as the optimizer executes in the critical path.

The representation of the GA solution incorporates two parts. First, the chromosome orientation, which is simply the reconfiguration plan (Eq. 5). The second part is the fitness function definition used to assess the quality of different reconfiguration plans. For this, the dynamic configuration optimizer 120 may apply the cost-benefit analysis as shown in Eq. 6 where fitness is the total number of operations (normalized for bus-tracking traces to account for different operations' scales) for the $T_L$ window for the tested reconfiguration plan and given workload. The dynamic configuration optimizer 120 may perform access historical baseline performance information to apply the individual solutions and to collect the corresponding fitness values, which are used to select the best solutions and to generate new solutions in the next generation.

To create the historical baselines, the system may be implemented with one or more NoSQL database management systems (DBMS). Workload traces may be fed into these DBMS's to create a baseline for each type of DBMS. The system may apply changes to the DBMS configurations using its constituent algorithms. The results of the workload may be evaluated to determine the throughput achieved by the application (in units of operations/second) when the DBMS was equipped with the system vs baseline configurations.

In some examples, the dynamic search optimizer may access a generic algorithm framework, such as the Python library, pyeasyga. In various experiments, a 0.8 crossover fraction and population size of 200 was submitted to the GA framework. After running 10 concurrent searches and picking the best configuration from those, it was found that runtime was dependent on the length of the lookahead period and the number of decision points. For MG-RAST, the GA has 30 decision points in the lookahead period and results in execution time of 30-40 sec. For the HPC workload, the number of decision points is 180 as it has a longer lookahead period, resulting in a runtime of 60-70 sec. For the bus-tracking workload, the GA has 48 decision points and a runtime of 20-25 sec. The GA is typically re-run toward the end of the lookahead period to generate the reconfiguration plan for the next lookahead time window. Also, if the actual workload is different from the predicted workload, the GA is re-invoked. This last case is rate limited to prevent too frequent invocations of the GA during (transient) periods of non-deterministic behavior of the workload.

The controller 122 may cause reconfiguration of the nodes based on reconfiguration plan (214). The controller 122 assure that the DBMS 104 maintains high availability through configurable redundancy parameters, consistency level (CL) and replication factor (RF). CL controls how many confirmations are necessary for an operation to be considered successful. RF controls how many replicas of a record exist throughout the cluster. Thus, a natural constraint for each record is RF>=CL. The controller may query token assignment information (where a token represents a range of hash values of the primary keys which the node is responsible for) from the cluster, using tools that ship with many DBMS distributions (like nodetool ring for Cassandra), and hence constructs what we call a minimum availability subset ($N_{min\ CL}$ for short). We define this subset as the minimum subset of nodes that covers at least CL replicas of all keys.

To meet CL requirements, the control may ensure that $N_{min\ CL}$ nodes are operational at any point of time. Therefore, the controller may make the design decision to configure up to $R=N_s-N_{min\ CL}$ servers at a time, where $N_{min\ CL}$ depends on RF, CL, and token assignment. If we assume a single token per node (Cassandra's default with vnodes disabled), then a subset of $[N_s/RF]$ nodes covers all keys at least once. Consequently, $N_{min\ CL}$ becomes $CL \times [N_s/RF]$ to cover all keys at least CL times. Thus, the number of reconfiguration steps=$N_s/R$=RF/(RF−CL) becomes independent of the cluster size $N_s$.

In the case where RF=CL, $N_{min\ CL}$ becomes equivalent to $N_s$ and hence the system cannot reconfigure without harming data availability, hence an aggressive variant may be applied in such cases. However, other DBMS's with high consistency requirements may follow a read/write quorum with CL=RF/2. The controller may reduce the number of available data replicas during the transient reconfiguration periods, and hence reduces the system's resilience to additional failures. However, one optional parameter in the system is how many failures during reconfiguration the user will want to tolerate (our experiments were run with zero). This is a high-level parameter that is intuitive to set by the database admin. Also notice that data that existed on the offline servers prior to reconfiguration is not lost due to the drain step, but data written during the transient phase has lower redundancy until the reconfigured servers get back online.

To reconfigure a DBMS cluster, the system may perform the following operations, R server instances at a time:
1. Drain: Before shutting down a DBMS instance on a node, we flush the entire Memtable to disk. This ensures that there are no pending commit logs to replay upon a restart.
2. Shutdown: The DBMS process is killed on the node.
3. Configuration file: Replace the configuration file with new values for all parameters that need changing.
4. Restart: Restart the DBMS process on the same node.
5. Sync: The system waits for DBMS's instance to completely rejoin the cluster by letting a coordinator know of where to locate the node and then synchronizing the missed updates during the node's downtime.

In some DBMS systems, such as Casandra, writes for down nodes are cached by available nodes for some period and re-sent to the nodes when they rejoin the cluster. The time that it takes to complete all these steps for one server is denoted by $T_r$, and $T_R$ for the whole cluster, where $T_R=T_r\times RF/(RF-CL)$. During all steps 1-5, additional load is placed on the non-reconfiguring servers as they must handle the additional write and read traffic. Step 5 is the most expensive and typically takes 60-70% of the total reconfiguration time, depending on the amount of cached writes. We minimize step 4 practically by installing binaries from the RAM and relying on draining rather than commit-log replaying in step 1, reducing pressure on the disk.

The steps may include additional, different, or fewer operations than illustrated in FIG. 2. The steps may be executed in a different order than illustrated in FIG. 2. Furthermore, the system 100 and methods described herein may be implemented in many ways and designed to achieve results with varying tradeoffs and benefits.

Figure 3:
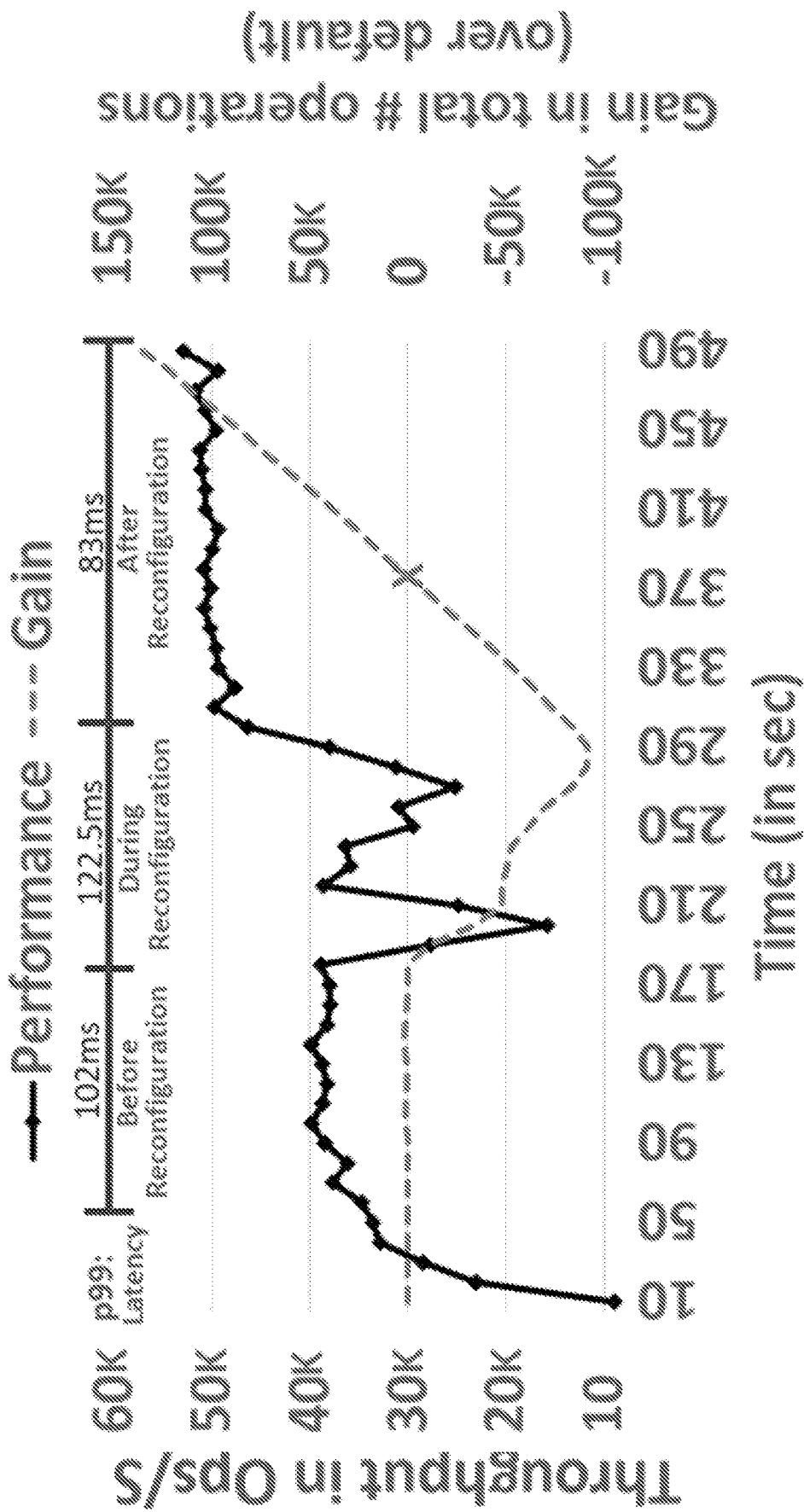
FIG. 3 illustrates an example of results obtained from an optimized reconfiguration plan.

FIG. 3 illustrates an example of the results obtained from an optimized reconfiguration plan. These results were achieved by applying a reconfiguration plan to a cluster of 2 nodes with an availability requirement that at least 1 of 2 be online (i.e. CL=1). The DBMS used to achieve these results was Casandra.

As illustrated in FIG. 3, the database cluster starts with a read-heavy workload but with a configuration C1 (Cassandra's default), which favors a write-heavy workload and is therefore suboptimal. With this configuration, the cluster provides a throughput of 40,000 ops/s and a tail latency of 102 ms (P99), but a better read-optimized configuration C2 exists, providing 50,000 ops/s and a P99 of 83 ms. The database cluster is reconfigured to the new C2 configuration setting by the controller, resulting in a temporary throughput loss due to the transient unavailability of the server instances as they undergo the reconfiguration, one instance at a time given the specified availability requirement. Also during the reconfiguration period, p99 increases to 122.5 ms on average. The two dips in throughput at 200 and 270 seconds correspond to the two server instances being reconfigured serially, in which two spikes in P99 of 180 ms are observed. We plot, using the dashed line, the gain (benefit minus performance cost) over time in terms of the total #operations served relative to the default configuration. It can be observed that there is a crossover point (the red X point in FIG. 3) with the duration of the new workload pattern, when there is a positive gain in the total #operations over default.

If the predicted workload pattern lasts longer than this threshold (190 seconds from the beginning of reconfiguration in our example), then there is a gain from this step and the system would instantiate the reconfiguration. Otherwise, the cost will outweigh the benefit, and any solution implemented without the CBA risks degrading the overall system performance. Thus, a naive solution (a simple extension of all existing static configuration tuners) that always reconfigures to the best configuration for the current workload will actually degrade performance for any reasonably fast-changing workload. Therefore, workload prediction and a cost-benefit analysis are performed to develop a reconfiguration plan that achieves globally optimal performance over time.

FIGS. 4-11 illustrate various experimental results achieved through the system and methods described herein. The discussion related to FIGS. 4-11 also provide additional or alternative implementations for the system and methods described herein.

Experimental Datasets

MG-RAST: In various experiments, real workload traces were accessed from MG-RAST, the leading metagenomics portal operated by the US Department of Energy. As the amount of data stored by MG-RAST has increased beyond the limits of traditional SQL stores (23 PB as of August 2018), it relies on a distributed NoSQL Cassandra database cluster. Users of MG-RAST are allowed to upload "jobs" to its pipeline, with metadata to annotate job descriptions. All jobs are submitted to a computational queue of the US Department of Energy private Magellan cloud. The system analyzed 80 days of query trace from the MG-RAST system from Apr. 19, 2017 till Jul. 9, 2017. From this data, several observations can be made: (i) Workloads' read ratio (RR) switches rapidly with over 26,000 switches in the analyzed period. (ii) A negative correlation of 0.72 is observed between the Workloads' read ratio and number of requests/s (i.e., load). That is due to the fact that most of the write operations are batched to improve network utilization. (iii) Majority (i.e., more than 80%) of the switches are abrupt, from RR=0 to RR=1 or vice versa. (iv) KRD (key reuse distance) is very large. (v) No daily or weekly workload pattern is discernible, as expected for a globally used cyber-infrastructure.

Bus Tracking Application Workload: In various experiments, real workload traces from a bus-tracking mobile application called Tiramisu. The Bus Tracking system provides live tracking of the public transit bus system. It updates bus locations periodically and allows users to search for nearby bus stops. There are four types of queries—read, update, insert, and scan (retrieving all the records in the database that satisfy a given predicate, which is much heavier than the other operations). We trained our model using 40 days of query traces, while 18 days were used as testing data. We draw several observations from this data: (i) The traces show a daily pattern of workload switches. For example, the workload switches to scan-heavy in the night and switches to update-heavy in the early morning. (ii) The Workload is a mixture of Update, Scan, Insert, and Read operations in the ratio of 42.2%, 54.8%, 2.82%, and 0.18% respectively. (iii) KRD is very small. From these observations, we notice that the workload is very distinct from MG-RAST and thus provides a suitable point for comparison.

Simulated Analytics Workload: For long-horizon reconfiguration plans, simulate synthetic workloads representative of batch-analytics jobs may be submitted to a shared HPC queue. We integrate a system that examines jobs while they wait in a queue prior to execution. Thus, the system may profile the jobs waiting in the queue, and hence forecast the aggregate workload over a look-ahead horizon, which is equal to the length of the queue. Each job is divided into phases: a write-heavy phase resembling an upload phase of new data, a read-heavy phase resembling executing analytical queries to the cluster, and a third, write-heavy phase akin to committing the analysis results. However, some jobs can be recurring (as shown in and running against already uploaded data. These jobs will execute the analysis phase directly, skipping the first phase. The size of each phase is a random variable with U(200,100K) operations, and whenever a job finishes, a new job is selected from the queue and executed. We vary the level of concurrency and have an equal mix of the two types of jobs and monitor the aggregate workload. It was also found that with an increase in concurrency, the aggregate pattern becomes smoother and the latency of individual jobs increases.

Experimental Results

The performance of system was evaluated under different experimental conditions for the three applications. In all experiments, both throughput and tail latency (p99) performance metrics were collected. However, since the two parameters have an almost perfect inverse relationship in all experiments, tail latency is omitted (except in FIGS. 5 and 7 The system was evaluated on on Amazon EC2 using instances of size M4.xlarge with 4 vCPU's, 16 GB of RAM, provisioned IOPS (SSD) EBS for storage and network bandwidth of 0.74 Gbits/s for all Cassandra servers and workload drivers. Each node is loaded with 6 GB of data initially (The system's performance is evaluated with greater data volumes in Experiment 4). The experiments applied concurrent clients to saturate the database servers and aggregate the throughput and tail latency observed by every client.

Baseline Comparisons

The performance of the system was compared using baseline configurations 1-5 below. Three variants of the system are considered with configurations 6-8.
(1) Default: The default configuration that ships with Cassandra. This configuration favors write-heavy workloads by design.
(2) Static Optimized: This baseline resembles the static tuner (RAFIKI) when queried to provide the one constant configuration that optimizes for the entire future workload. This is an impractically ideal solution since it is assumed here that the future workload is known perfectly. However, non-ideally no configuration changes are allowed dynamically.
(3) Naive Reconfiguration: Here, when the workload changes, RAFIKI's provided reconfiguration is always applied, instantiated by concurrently shutting down all server instances, changing their configuration parameters, and restarting all of them. Practically, this makes data unavailable and may not be tolerable in many deployments such as user-facing applications. The static configuration tuners are silent about when the optimal configurations determined by them must be applied and this baseline is a logical instantiation of all of the prior work.
(4) ScyllaDB: The performance of NoSQL database ScyllaDB in its vanilla form. ScyllaDB is touted to be a much faster (10× or higher) drop-in replacement to Cassandra. This stands in for other self-tuning databases.
(5) Theoretical Best: This baseline resembles the theoretically best achievable performance over the predicted workload period. This is simulated by assuming Cassandra is running with the optimal configuration at any point of time and not penalizing it for the cost of reconfiguration. This serves as an upper bound for the performance.
(6) Oracle-based: This is the system with a fully accurate workload predictor.
(7) Aggressive: A variant form of the system that prefers faster reconfiguration over data availability and is used only when RF=CL. AGGRESSIVE violates the availability requirement by reconfiguring all servers at the same time. Unlike Naive, it uses the CBA model to decide when to reconfigure, and therefore it does not execute reconfiguration every time the workload changes.
(8) Casandra-based: This follows the system where the DBMS is Casandra Experiment 1: MG-RAST Workload Experimentation was conducted with 20 test days of MG-RAST data. To zoom into the effect of the system with different levels of dynamism in the workload, workloads were segmented into 4 scenarios and present those results in addition to the aggregated ones.

Figure 4:
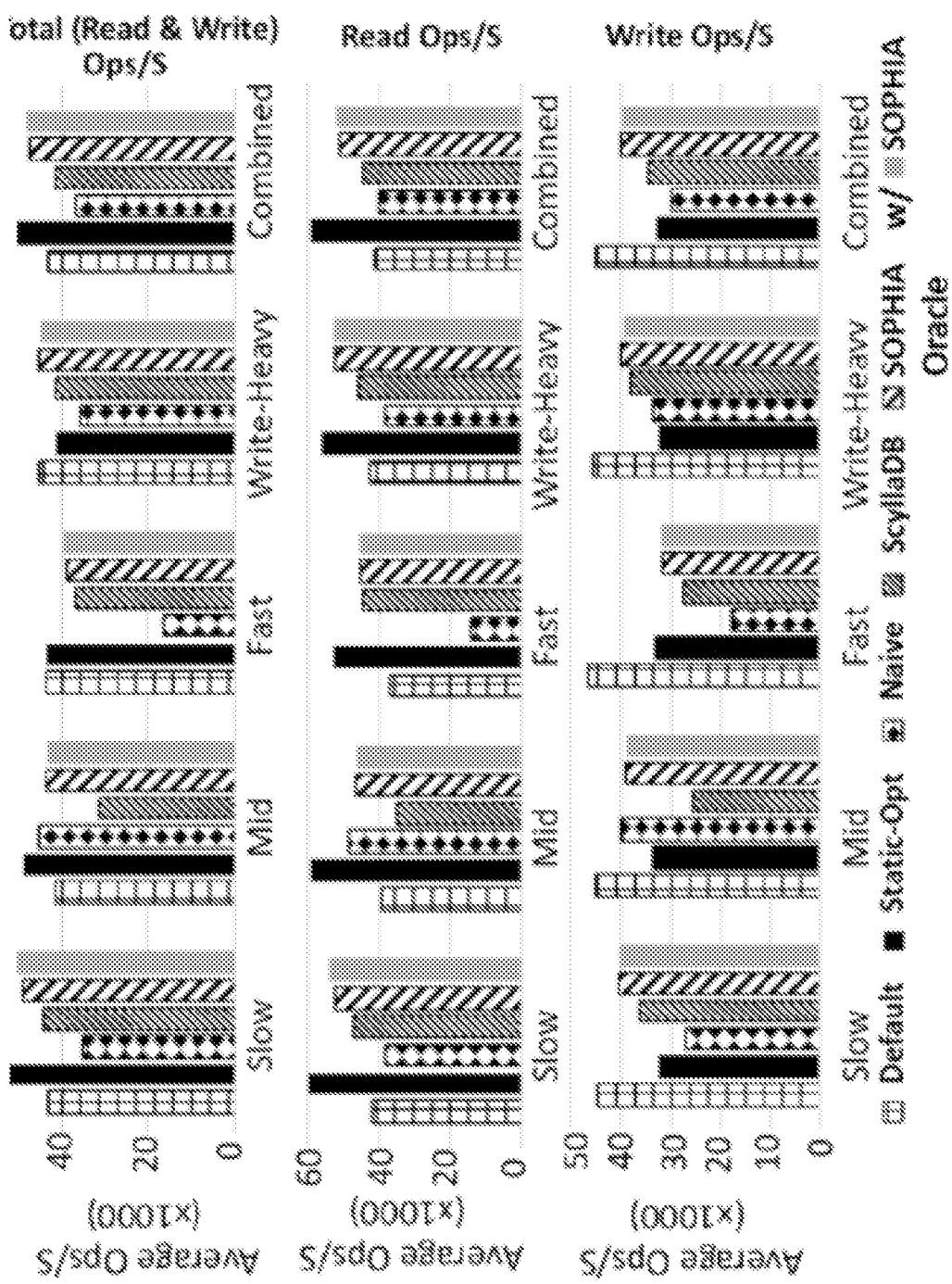
FIG. 4 illustrates an example of experimentation results obtained with MG-RAST data, which is essentially data from a genomics data repository and analysis pipeline.

FIG. 4 illustrates an example of experimentation results obtained using MG-RAST data. From FIG. 4, it can be observed that the system outperforms naive in total ops/s (average of 31.4%) and individually in read (31.1%) and write (33.5%) ops/s. The system also outperforms the default for the slow and the mid frequency cases, while it slightly under performs in the fast frequency case. The average improvement due to the system across the 4 categories is 20.4%. The underperformance for the fast case is due to increased prediction error. Naive baseline has a significant loss compared to default: 21.6%. The static optimized configuration (which for this workload favors read-heavy pattern) has a slightly higher throughput over the system by 6.3%. This is because the majority of the selected samples are read periods (RR=1), which hides the gain that the system achieves for write periods. However, we see that with respect to write operations, the system achieves 17.6% higher throughput than the static optimized configuration. Increased write throughput is critical for MG-RAST to support the bursts of intense writes. This avoids unacceptable queuing of writes, which can create bottlenecks for subsequent jobs that rely on the written shared dataset. Moreover, we observe that the system performs within 2-3% to the system w/Oracle in all scenarios, which shows the minor impact of the workload predictor accuracy. For instance, the system w/Oracle shows a 2% reduction in performance compared to the system in the slow trace. This is because Oracle has perfectly accurate predictions for $T_L$=5 min only. With this very short lookahead, the system makes greedy reconfiguration decisions, and hence does not achieve globally optimal performance over other baselines.

Only in the read-heavy case (the "Slow" scenario) does ScyllaDB outperform. Even in this case, the system is able to reconfigure Cassandra at runtime and turn out a performance benefit over ScyllaDB. We conclude that based on this workload and setup, a system owner can afford to use Cassandra with the system for the entire range of workload mixes and not have to transition to ScyllaDB.

Experiment 2: Tiramisu Workload

Figure 5:
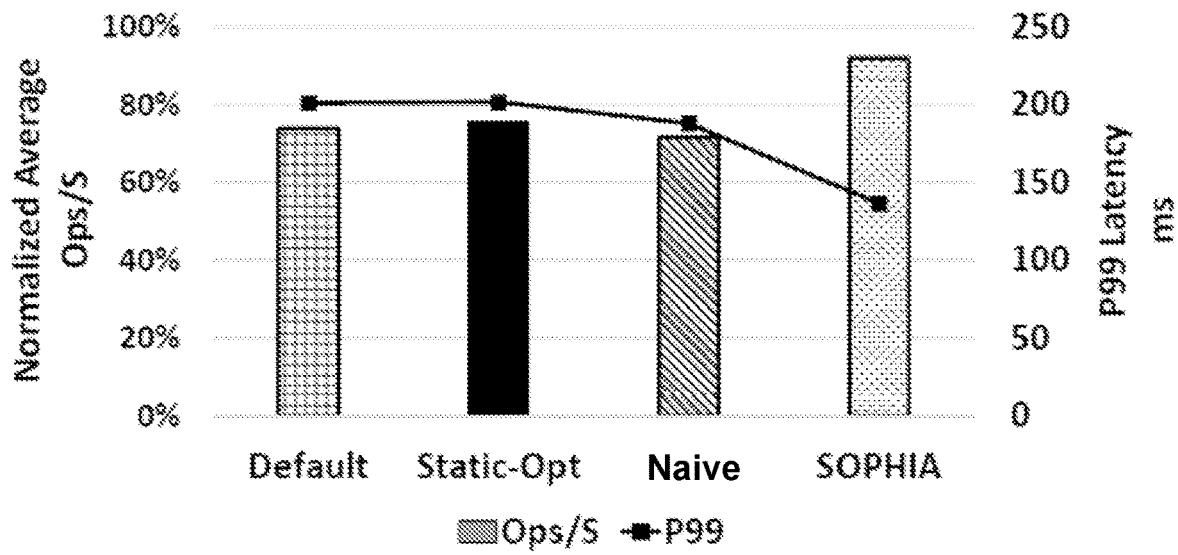
FIG. 5 illustrates an example of experimental results with bus-tracking application traces.

FIG. 5 illustrates experimental results of the system evaluated using the bus-tracking application traces. FIG. 5 shows the gain of applying the system over the various baselines. In this experiment, the system may report a normalized average Ops/s instead of the absolute average Ops/s metric. This means we normalize each of the 4 operation's throughputs by dividing by the maximum Ops/s seen under a wide variety of configurations and then average the 4 normalized throughputs. The reason for this is that for this workload, different operations have vastly different throughput scales. For example, when the work-load switches to a Scan-heavy phase, the performance of the cluster varies from 34 Ops/s to 219 Ops/s depending on the configuration of the cluster. For an Update-heavy phase, the performance varies from 1,739 Ops/s to 5,131 Ops/s. This is because Scan is a much heavier operation for the DBMS compared to Update.

The system outperforms default configuration by 24.5%, Static-Opt by 21.5%, and Naive by 28.5%. The gains are higher because the system can afford longer lookahead times with accurate workload prediction. Its notable that Naive is achieves a comparable performance to both Default and Static-Opt configurations, unlike MG-RAST. This is because the frequency of workload changes is lower here. However, Naive still renders the data unavailable during the reconfiguration period.

Unlike MG-RAST, the bus-tracking application traces provided a daily pattern which allows our prediction model to provide longer lookahead periods with high accuracy. A Markov Chain prediction model was applied to capture the workload switching behavior, and the state of the workload was defined as the proportion of each operation type in an aggregation interval (15 minutes in our experiments).

For example, in this experiment, Update=40%, Read=20%, Scan=40%, Insert=0% represents a state of the workload. A quantization level of 10% in any of the 4 dimensions is used to define the state. The second-order Markov Chain is used with a lookahead period of 5 hours. The second order model is more accurate at all lookahead times, since there is enough training data available for training the models. Seeing the seeming regular diurnal and weekly pattern in the workload, two simple predictor strawmen where created, which use the current time-stamp or the current time-stamp and day of the week as input features to perform prediction. The predicted workload is the average of the mixtures at the previous 10 points. These predictors have unacceptably high RMSE of 31.4% and 24.0%. Therefore, although the workload is showing a pattern, we cannot generate the optimal plan once and use it for all subsequent days. Therefore, online workload monitoring and prediction is needed to achieve the best performance.

Experiment 3: HPC Data Analytics

Figure 6:
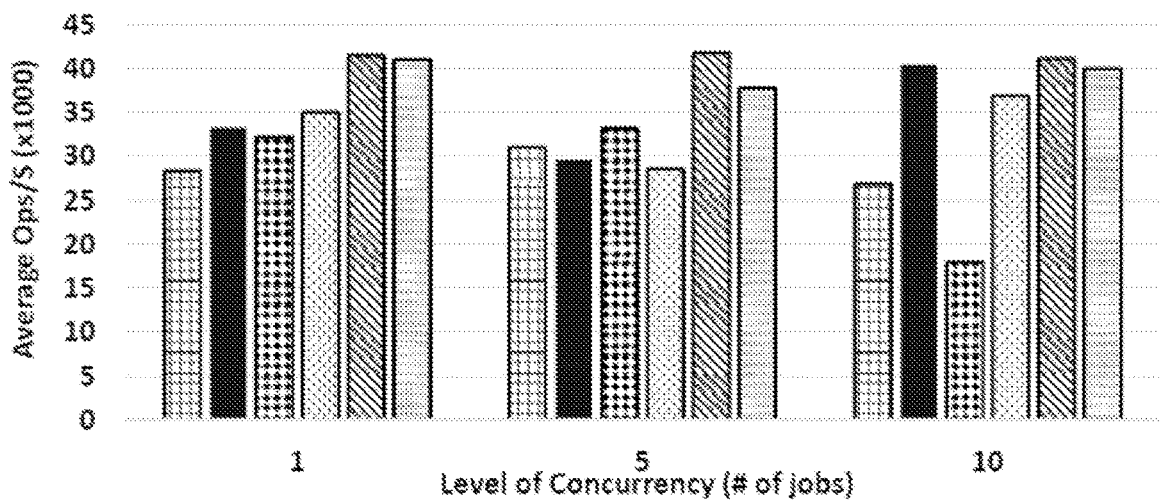
FIG. 6 illustrates an example of experimental results with high-performance computing (HPC) data analytics workload patterns.

FIG. 6 illustrates experimental results of the system using HPC data analytics workload patterns. Here the lookahead is the size of the job queue, which is con-servatively taken as 1 hour. FIG. 6 shows the result for the three levels of concurrency (1, 5, and 10 jobs). We see that the system outperforms the default for all the three cases, with average improvement of 30%. In comparison with Static-Opt (which is a different configuration in each of the three cases), its notable that the system outperforms for the 1 job and 5 jobs cases by 18.9% and 25.7%, while it is identical for the 10 jobs case. This is because in the 10 jobs case, the majority of the workload lies between RR=0.55 and RR=0.85, and in this case, the system switches only once: from the default configuration to the same configuration as Static-Opt. Its also notable that the system achieves within 9.5% of the theoretical best performance for all three cases. In addition, the system achieves significantly better performance over Naive by 27%, 13%, and 122% for the three cases. Naive, in fact, degrades the performance by 32.9% (10 concurrent jobs). In comparison with ScyllaDB, the system achieves a performance benefit of 17.4% on average, which leads to a similar conclusion as in MG-RAST about the continued use of Cassandra.

Experiment 4: Scale-Out & Greater Volume

Figure 7:
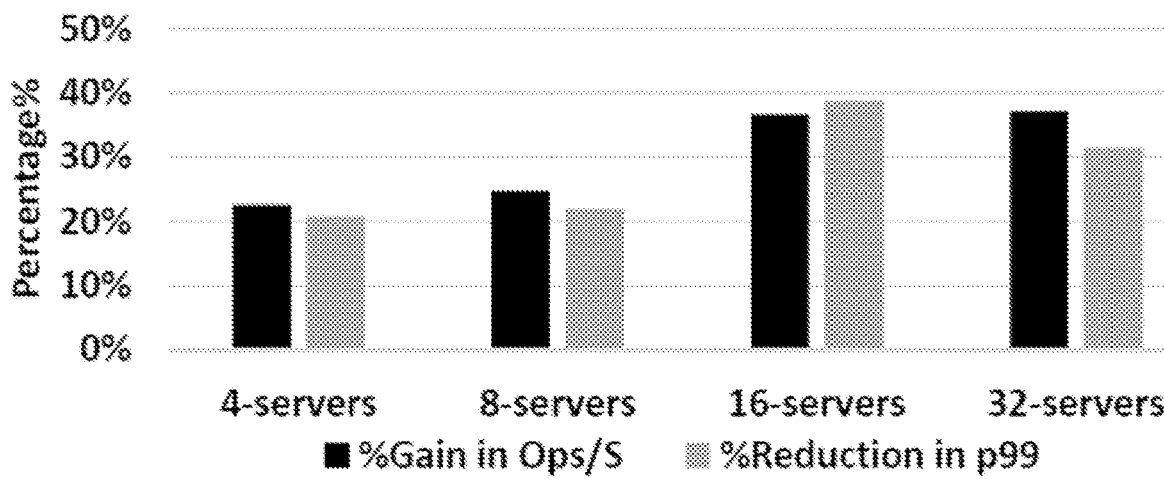
FIG. 7 illustrates behavior of the system, with respect to the system's performance (throughput and latency), with increasing scale.

FIG. 7 illustrates behavior of the system with increasing scale using the data analytics workload with comparison between the system and Static-Opt (all other baselines performed worse than Static-Opt). Here, a weak scaling pattern is used, i.e., keeping the amount of data per server fixed while still operating close to saturation. Number of shooters was increased as well to keep the request rate per server fixed. The number of reconfiguration steps stays constant with scale. Its notable that the network bandwidth needed by Cassandra's gossip protocol increases with the scale of the cluster, causing the network to become the bottleneck in the case of 16 and 32 servers when M4.xlarge instances are used. Therefore, the instance type was changed to M5.xlarge in these cases (network bandwidth of 10 Gbit/s compared to 0.74 Gbit/s). The results show that the system's optimal reconfiguration policy has a higher performance over Static-Opt across all scales. Moreover, we see a higher gain in the cases of 16 and 32 servers since M5 instances have higher CPU power than M4 ones. This extra CPU capacity allows for faster leveled compaction, which is used by the system's plan (while Static-Opt uses size-tiered compaction), and hence leads to greater performance difference for reads.

Figure 9:
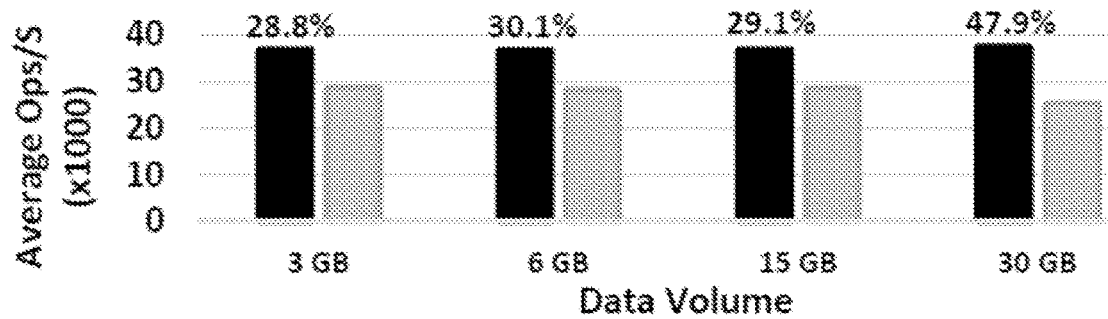
FIG. 9 illustrates an example of experimental results with increasing data volume per node.

The system was also evaluated with the same workload when the data volume per node increases (See FIG. 9). The amount of data loaded initially into each node was varied (in a cluster of 4 nodes). The gain over Static-Opt is illustrated in FIG. 9 For the 30 GB case, the data volume grows beyond the RAM size of the used instances (M4.xlrage with 16 GB RAM). Its notable that the gain from applying the system's reconfiguration plan is consistent with increasing the data volume from 3 GB to 30 GB. It is also notable that the gain increases for the case of 30 GB. This is also due to the different compaction methods used by Static-Opt (size-tiered) and the system (Leveled compaction), the later can provide better read performance with increasing data volumes. However, this benefit of Leveled compaction was not captured by RAFIKI predictions, which was trained on a single node with 6 GB of data. This can be addressed by either replacing RAFIKI by a data volume-aware static tuner, or re-training RAFIKI when a significant change in data volume per node occurs.

Experiment 5: Varying RF and CL

Figure 8:
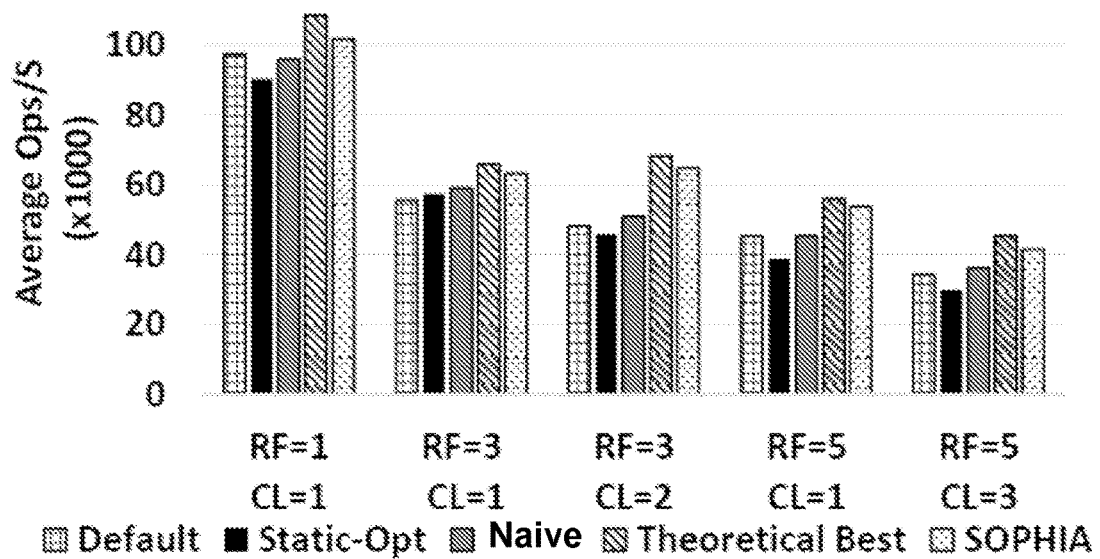
FIG. 8 illustrates experimental results of applying a system to clusters with different replication factors (RF) and consistency levels (CL)

FIG. 8 illustrates experimental results of applying the system to clusters with different RF and CL values. An HPC workload with 5 concurrent jobs was used. The number of nodes was set to 8, and RF and CL were varied as shown in FIG. 8 (CL quorum implies CL=[RF/2]. Its notable that the system continues to achieve better performance than all 3 static baselines for all RF, CL values. For RF=1, CL=1, we use AGGRESSIVE because when RF=CL, we cannot reconfigure the cluster without degrading availability. The key observation is that the system's performance gets closer to the Theoretical best as RF-CL becomes higher (compare the RF=3,CL=1 to the RF=5,CL=1 case). This is because the number of steps the system to performs for the reconfiguration is inversely proportional to RF-CL. This allows the system to react faster to changes in the applied workload and thus achieve better performance. Moreover, we notice that the performance of the cluster degrades with increasing RF or CL. Increasing RF increases the data volume stored by each node, which increases the number of SSTables and hence reduces the read performance. Also increase in CL requires more nodes to respond to each request before acknowledgment to the client, which also reduces the performance.

Experiment 6: Noisy Workload Predictions

Figure 10:
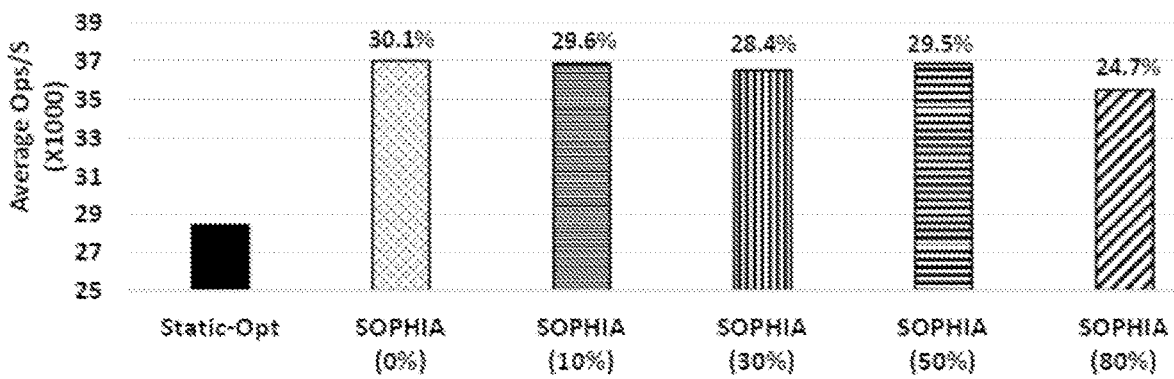
FIG. 10 illustrates an example of experimental results when noise is present in the predicted workload pattern, indicating the system's resilience to noise in the workload prediction especially relevant to dynamic, time-varying workloads.

FIG. 10 illustrates experimental results when noise is present in the predicted workload pattern. An HPC workload with 5 concurrent jobs was used. In HPC queues, there are two typical sources of such noise—an impatient user removing a job from the queue and the arrival of hitherto unseen jobs. We add noise to the predicted workload pattern U(-R, R), where R gives the level of noise. The resulting value is bounded between 0 and 1.

From FIG. 10, it can be observed that adding noise to the system slightly reduces its performance. However, such noise will not cause significant changes to the system's optimal reconfiguration plan. This is because the system treats each entry in the reconfiguration plan as a binary decision, i.e., reconfigure if Benefit Cost. So even if the values of both Benefit and Cost terms change, the same plan takes effect as long as the inequality still holds. This allows the system to achieve significant improvements for long-term predictions even with high noise levels.

Experiment 7: Redis Case Study

Figure 11A:
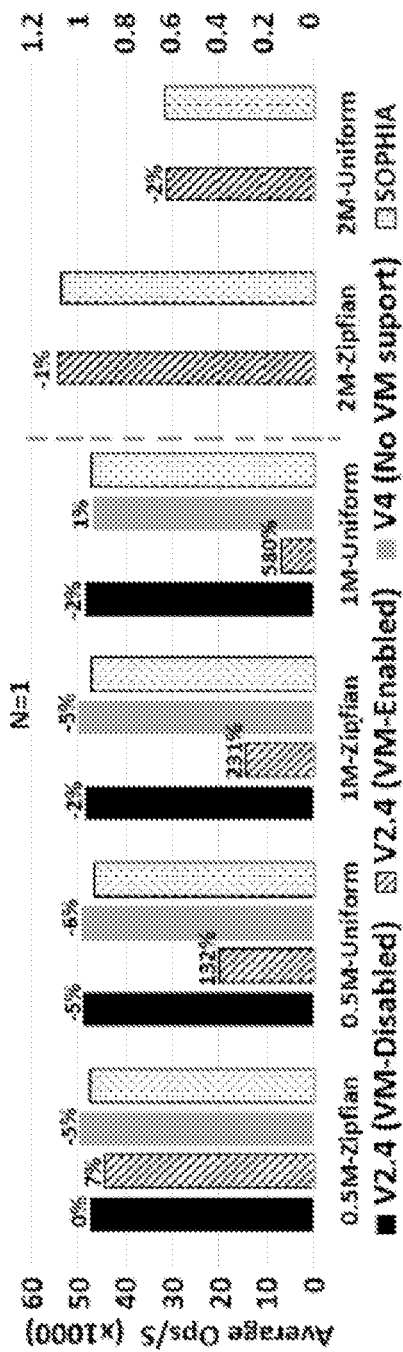
FIG. 11A-B illustrates experimental results from a case study with a popular NoSQL database.
Figure 11B:
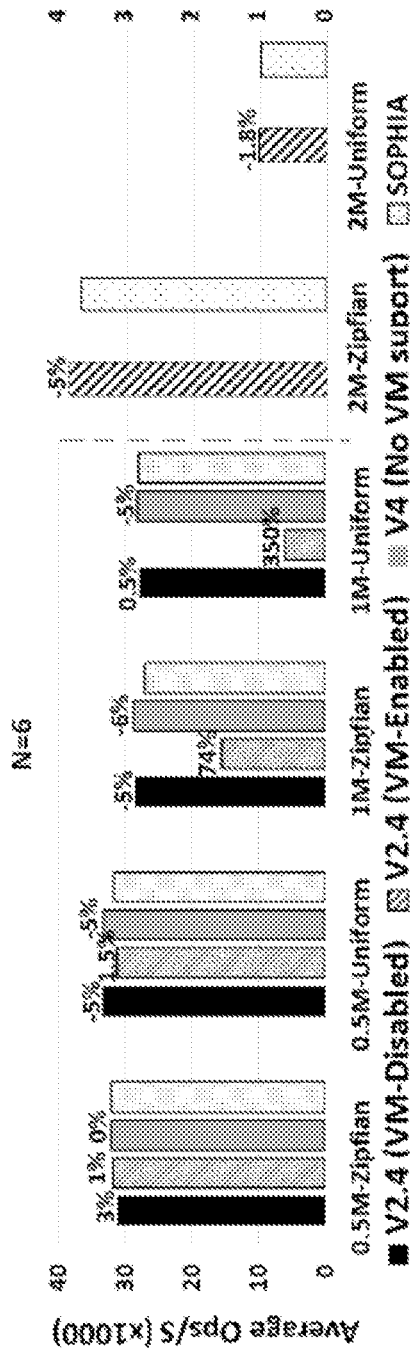

FIG. 11A-B illustrates experimental results from a case study with the popular NoSQL database REDIS, which has a long-standing pain point in setting a performance-critical parameter against changing workloads. Large-scale processing frameworks such as Spark can deliver much higher performance when combined with Redis due to its shared distributed memory infrastructure. Redis is an in-memory data store (stores all keys and values in memory) while writing to persistent storage is only supported for durability. However, in its earlier versions (till V2.4), Redis used to offer a feature called Virtual Memory. This feature allowed Redis to work on datasets larger than the available memory by swapping rarely used values to disk, while keeping all keys and hot values in memory. Since V2.4, this feature was removed as it caused serious performance degradation in many Redis deployments due to non-optimal setting. In various experiments, the system, to tuned this feature the resultant performance was compared to three baselines: (1) Redis V2.4 with VM-disabled (Default configuration), (2) Redis V2.4 with VM-enabled, (3) Redis V4 with default configuration (no VM support, most production-proven).

To tune Redis' VM, the system optimizes configuration parameters including (1) vm-enable: a Boolean parameter that enables or disables the feature. (2) vm-max-memory: the memory limit after which Redis starts swapping least-recently-used values to disk. These features cannot be reconfigured without a server restart.

The popular YCSB (Yahoo! Cloud Serving Benchmark) tool was used to simulate HPC workloads. 128 data points were collected for jobs that vary with respect to their sizes (0.5M, 1M, 2M), their access patterns (i.e., read-heavy vs write-heavy) and also their request distribution (i.e., Uniform vs Zipfian). 75% of the data points (selected uniformly) were used to train a linear regression model and 25% for testing. The model provides accurate prediction of throughput for any job and configuration (avg. $R^2$=0.92). Therefore, this simpler model was used in place of the more sophisticated, deep learning-based static tuner, Rafiki.

Redis can operate in Stand-alone mode as well as a Cluster mode [37]. In Cluster mode, data is automatically sharded across multiple Redis nodes. We show the gain of using our system with Redis for both modes of operation. No replication is used for Stand-alone mode. Whereas for Cluster mode, we use a replication factor of 1 (i.e., a single slave per master). We use AWS servers of type C3.Large with 2 vCPUs and 3.75 GB RAM each. Selecting such a small RAM server demonstrates the advantage of using VM with jobs that cannot fit in memory-1.8M records fit in the memory. We evaluate the performance of the system on a single server (FIG. 11a) as well as a cluster of 6 servers with 3 masters and 3 slaves (FIG. 11b) and report the average throughput per server. From FIG. 11A-B we see that for all record sizes and request distributions, the system performs the best or close to the best. If records fit in memory, then the no VM configuration is better. For Uniform distribution, VM performs worst, because records often have to be fetched from disk. If records do not fit in memory, the no VM options (including the latest Redis) will simply fail (hence the lack of a bar for 2.0M records). Thus, the system, by automatically selecting the right parameters for changing workloads, can achieve the best of both worlds: fast in-memory database, and leverage disk in case of spillover.

The system 100 may be implemented with additional, different, or fewer components than illustrated. Each component may include additional, different, or fewer components.

Figure 12:
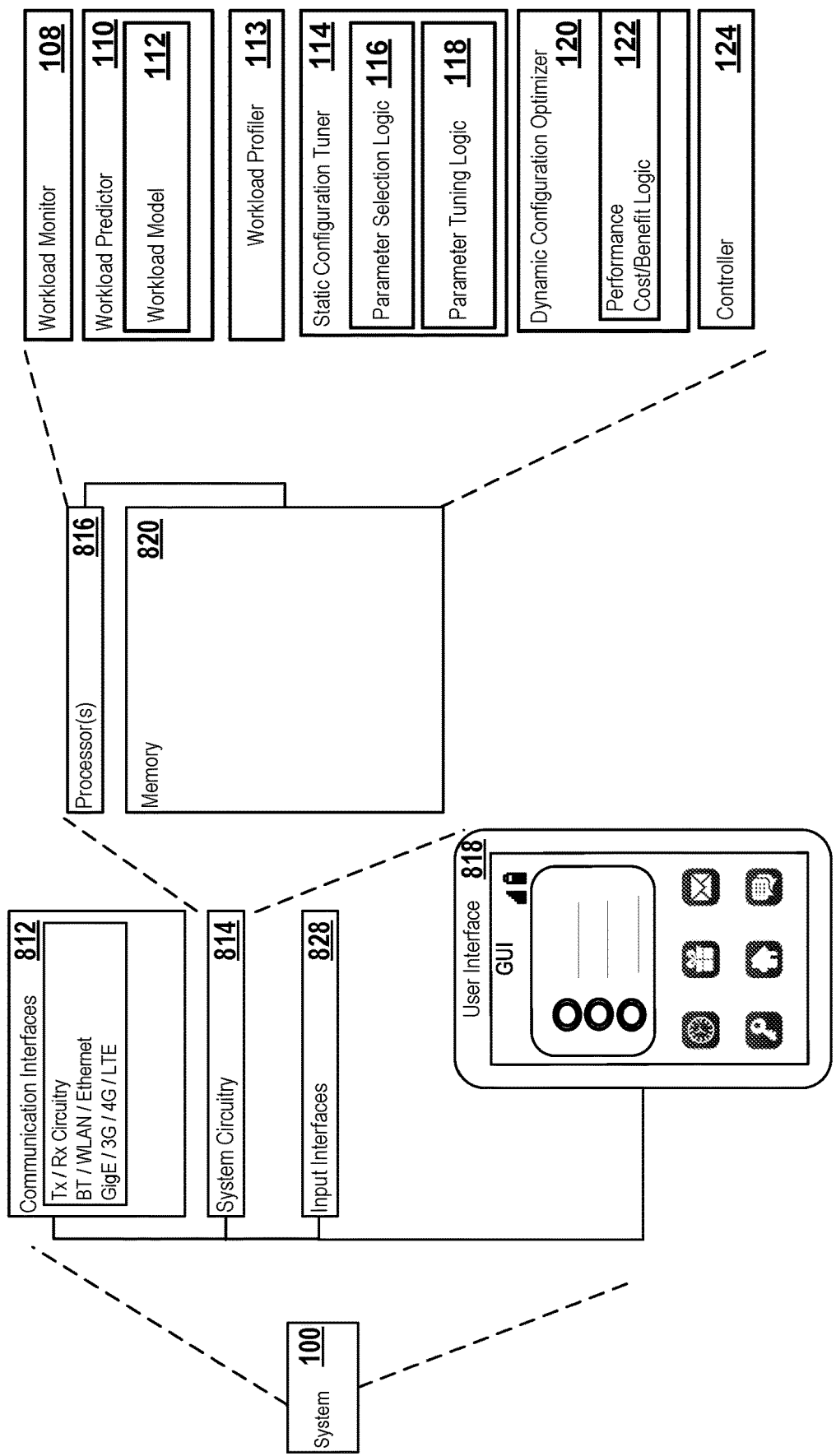
FIG. 12 illustrates a second example of a system.

FIG. 12 illustrates a second example of the system 100. The system 100 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations the workload monitor 108, the workload predictor 110, the workload model 112, the workload profiler 113, the static configuration tuner 114, the perimeter selection logic 116, the parameter tuning logic 118, the dynamic configuration optimizer 120, the performance cost/benefit logic 122, and/or the system 100. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the workload monitor 108, the workload predictor 110, the workload model 112, the workload profiler 113, the static configuration tuner 114, the perimeter selection logic 116, the parameter tuning logic 118, the dynamic configuration optimizer 120, the performance cost/benefit logic 122, and/or the system 100. Alternatively or in addition, the memory may include any other component or subcomponent of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many ways. In some examples, the system 100 may be implemented with one or more logical components. For example, the logical components of the system 100 may be hardware or a combination of hardware and software. The logical components may include the workload monitor 108, the workload predictor 110, the workload model 112, the workload profiler 113, the static configuration tuner 114, the perimeter selection logic 116, the parameter tuning logic 118, the dynamic configuration optimizer 120, the performance cost/benefit logic 122, the system 100 and/or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A system, comprising:
a processor, the processor configured to:
forecast a plurality of workload measurements for a database management system (DBMS) at a plurality of respective times based on a workload model, the workload measurements indicative of a load on a database management system, the database management system comprising a plurality of nodes, the nodes comprising respective databases;
determine, based on the forecasted workload measurements, a plurality of configuration parameter sets optimized for the database management system at the respective times;
generate a reconfiguration plan comprising at least two of the configuration parameters sets and corresponding reconfiguration times to apply the configuration parameter sets, respectively;
determine a performance gain measurement that would result from reconfiguring nodes of the DBMS with the configurations parameter sets according to the reconfiguration times, and
determine a performance loss measurement that would result from the respective databases of the nodes being inaccessible during reconfiguration with the configuration parameter sets;
select a reconfiguration plan in response to the performance gain measurement and the performance loss measurement satisfying a fitness criteria; and
cause, at the reconfiguration times, the nodes to begin reconfiguration with the configuration parameter sets included in the selected reconfiguration plan.

2. The system of claim 1, wherein to cause, at the reconfiguration times, the nodes to begin reconfiguration with the configuration parameter sets included in the selected reconfiguration plan, the processor is further configured to:
access, at a reconfiguration time, a configuration parameter set from the selected reconfiguration plan;
stop a database management instance on at least one of the nodes of the database management system;
replace a previous configuration parameter with a parameter from a configuration parameter set; and
restart the database management instance on the at least one of the nodes of the database management system.

3. The system of claim 1, wherein to cause, at the reconfiguration times, the nodes to begin reconfiguration with the configuration parameter sets included in the selected reconfiguration plan, the processor is further configured to:
for each of the reconfiguration times:
reconfiguring a first group of nodes of a cluster with a corresponding configuration parameter set, wherein databases of the first group of nodes are inaccessible during reconfiguration; and
applying the configuration parameter set to a second group of nodes only after the first group of nodes reconfigured and the databases are accessible.

4. The system of claim 1, wherein to determine the performance loss measurement further, the processor is further configured to:
forecast performance loss due to reconfiguration of the nodes at the reconfiguration times; and
aggregate the forecasted performance lost at each of the reconfiguration times due to downtime or degradation of one or more nodes.

5. The system of claim 1, wherein the respective databases of the nodes comprise NOSQL databases.

6. The system of claim 1, wherein to determine, based on the workload measurements, the plurality of configuration parameter sets optimized for the database management system at the respective times, the processor is further configured to:
access a machine learning model trained with training data comprising historical workload metrics, historical configuration sets, and historical performance metrics; and
identify, based on a machine learning model and the forecasted workload, a configuration parameter set where historical performance metrics are maximized.

7. The system of claim 1, wherein to select the reconfiguration plan in response to the performance gain measurement and the performance loss measurement satisfying a fitness criteria, the processor is further configured to:
iteratively generate a plurality of reconfiguration plans;
determine respective performance loss measurements and performance gain measurements for each of the generated reconfiguration plans;
determine a plurality of net performance gains for the reconfiguration plans, respectively, the net performance gains based on the performance loss measurements and the performance gain measurements; and
select, from the reconfiguration plans, the reconfiguration plan in response to the corresponding net performance gain being the highest.

8. A method, comprising:
forecasting a plurality of workload measurements for a database management system (DBMS) at a plurality of respective times based on a workload model, the workload measurements indicative of a load on a database management system, the database management system comprising a plurality of nodes, the nodes comprising respective databases;
determining, based on the forecasted workload measurements, a plurality of configuration parameter sets optimized for the database management system at the respective times;
generating a reconfiguration plan comprising at least two of the configuration parameters sets and corresponding reconfiguration times to apply the configuration parameter sets, respectively;
determining a performance gain measurement that would result from reconfiguring nodes of the DBMS with the configurations parameter sets according to the reconfiguration times, and
determining a performance loss measurement that would result from the respective databases of the nodes being inaccessible during reconfiguration with the configuration parameter sets;
selecting a reconfiguration plan in response to the performance gain measurement and the performance loss measurement satisfying a fitness criteria; and
causing, at the reconfiguration times, the nodes to begin reconfiguration with the configuration parameter sets included in the selected reconfiguration plan.

9. The method of claim 8, wherein causing, at the reconfiguration times, the nodes to begin reconfiguration with the configuration parameter sets included in the selected reconfiguration plan further comprises:
accessing, at a reconfiguration time, a configuration parameter set from the selected reconfiguration plan;
stopping a database management instance on at least one of the nodes of the database management system;
replacing a previous configuration parameter with a parameter from a configuration parameter set; and
restarting the database management instance on the at least one of the nodes of the database management system.

10. The method of claim 8, wherein causing, at the reconfiguration times, the nodes to begin reconfiguration with the configuration parameter sets included in the selected reconfiguration plan further comprises:
for each of the reconfiguration times:
reconfiguring a first group of nodes of a cluster with a corresponding configuration parameter set, wherein databases of the first group of nodes are inaccessible during reconfiguration;
applying the configuration parameter set to a second group of nodes only after the first group of nodes reconfigured and the databases are accessible.

11. The method of claim 8, wherein determining the performance loss measurement further comprises:
forecasting performance loss due to reconfiguration of the nodes at the reconfiguration times; and
summing the forecasted performance lost at each of the reconfiguration times due to downtime or degradation of one or more nodes.

12. The method of claim 8, wherein the respective databases of the nodes comprise of NOSQL databases.

13. The method of claim 8, wherein determining, based on the workload measurements, the plurality of configuration parameter sets optimized for the database management system at the respective times further comprises:
accessing a machine learning model trained with training data comprising historical workload metrics, historical configuration sets, and historical performance metrics; and
identifying, based on a machine learning model and the forecasted workload, a configuration parameter set where historical performance metrics are maximized.

14. The method of claim 8, wherein selecting a reconfiguration plan in response to the performance gain measurement and the performance loss measurement satisfying a fitness criteria further comprises:
iteratively generating a plurality of reconfiguration plans;
determining respective performance loss measurements and performance gain measurements for each of the generated reconfiguration plans;
determining a plurality of net performance gains for the reconfiguration plans, respectively, the net performance gains based on the performance loss measurements and the performance gain measurements; and
selecting, from the reconfiguration plans, the reconfiguration plan in response to the corresponding net performance gain being the highest.

* * * * *